UNITED STATES PATENT OFFICE.

JONAS W. AYLSWORTH, OF EAST ORANGE, NEW JERSEY, ASSIGNOR, BY DIRECT AND MESNE ASSIGNMENTS, TO CONDENSITE COMPANY OF AMERICA, OF EAST ORANGE, NEW JERSEY, A CORPORATION OF NEW JERSEY.

PLASTIC COMPOSITION AND METHOD OF MAKING SAME 1,102,631.

Specification of Letters Patent.

Patented July 7, 1914.

No Drawing.

Application filed August 6, 1910. Serial No. 575,970.

*To all whom it may concern:*

Be it known that I, JONAS W. AYLSWORTH, a citizen of the United States, and a resident of East Orange, in the county of Essex and State of New Jersey, have invented certain new and useful Improvements in Plastic Compositions and Methods of Making Same, of which the following is a description.

My invention relates to a new composition of matter and process of making the same; it will be specifically described in its application to the manufacture of duplicate sound records of either the cylindrical or disk type.

The object of the invention is the formation of a product which has certain qualities and refinements which it has heretofore been impossible to attain.

Condensation products of phenolic bodies and formaldehyde or other substance containing the methylene radical $CH_2$, in their final hard infusible condition, such as are obtained by methods disclosed in my applications Serial Nos. 496,060, filed May 14, 1909, and 543,236 filed February 11, 1910, and Patent No. 1,020,593, granted March 19, 1912, are preëminently suited as the material for forming the record surface of duplicate sound records, and the present invention may be practised for making the same of improved quality. It is customary in the manufacture of sound records of various compositions and in the production of compositions to be molded generally to incorporate an inert filling body with the composition for the purpose of cheapening and toughening the same. Such a procedure, however, results in the formation of a sound record or other object of non-uniform texture, from which circumstance arise certain difficulties.

The improved qualities of the composition comprising my present invention, particularly when the same is formed into a sound record, are attained by forming the record or other object of a uniform texture and at the same time obtaining the advantages in manufacture and strength of a record or other object of non-uniform texture. That is to say, my improved composition in its final condition is a homogeneous mass of a final infusible insoluble phenolic condensation product. At the same time the advantages of employing a non-homogeneous mass formed by the incorporation of a powdered or fibrous filling material with a binder are attained by the process I employ, in which a final hard infusible insoluble phenolic condensation product in comminuted condition is used as the filling body, being thoroughly mixed through a fusible soluble phenolic condensation product, with which is mixed a hardening agent such as hexa-methylene-tetra-amin, formaldehyde, or a polymer thereof, the hardening agent and the fusible product reacting upon application of sufficient heat to form the final infusible product, the comminuted infusible final product used as a filler becoming an integral part of the mass upon the completion of the reaction.

In my application Serial No. 543,236, above referred to, I allude to the possibility of using infusible condensation products in powdered form as a filling agent in a composition for making sound records. The use of filling bodies in compositions of the character referred to is advantageous in that they strengthen the product and overcome or counteract the stresses which are set up in the product, and cheapen and facilitate manufacture. Products of non-uniform texture, however, that is, those containing wood pulp, fiber or other fillers of well known character, differing in character from the binding material, have the disadvantage when used for the production of sound records that they cause foreign sounds or scratching noises when the records are played, because of unequal expansion between the filler and the other elements of the composition, due to changes of temperature, and also due to the compression of the record and the subsequent release of the same when the records are molded by hydraulic presses or the like, which causes the air in the pores of the filler to be compressed and subsequently expand when pressure is released, which causes the surface of the object to be made microscopically rough. Such records are also more susceptible to atmospheric influence generally than are records containing no such filling bodies, and if the filler is of a mineral nature, the reproducing stylus is apt to be worn thereby.

My invention comprises three steps. First, the production of a comminuted powder of an infusible condensation product of full degree of hardness. Second, the incorporation of the comminuted powder with an unhardened or fusible condensation product capable of being transformed into the infusible variety by heating to the required temperature. Third, the molding of the same in a sound record matrix or other matrix.

The first step may be carried out by forming the final product in any of the well known ways and mechanically comminuting the same to the required state of sub-division. The final infusible product may, however, be more easily crushed or comminuted in the following manner, by causing the reaction to take place in such a manner in a volatile solvent that a porous, easily comminuted product is obtained. To accomplish this result, the necessary ingredients from which the final product is formed by heat application are dissolved in a suitable solvent, and the solution heated in such a manner that the solvent is prevented from escaping. The temperature employed in the reaction may be from 200 to 260 degrees F. or higher. A separation of the final infusible product from the solvent results, and the solvent is recovered by evaporation and condensation for subsequent use. The final insoluble infusible mass, which has been rendered microscopically porous by its formation in the solvent, may be comminuted while still contained in the solvent or after removal of the latter. Amyl acetate, alcohol, amyl alcohol, or other common solvents of the ingredients used for forming the product may be used in this process. Phenol, or the like, together with sufficient formaldehyde or other substance containing the methylene radical $CH_2$ to react together to form the final product, may be the substances dissolved in the solvent, and the final substance formed in one step from these primary ingredients, or if desired, a fusible soluble phenolic condensation product, such as described in my applications and patent above referred to, together with approximately 10% or other suitable proportion of methylene-containing agent to react with the fusible product to form the final product, may be the ingredients used. If desired, a non-volatile solvent or a plasticity agent, such as described in my applications above referred to, such, for example, as mono-chloro-naphthalene, may also be a component of the reacting mass, in which case the dried infusible powder to be used as a filling body will possess the property of being plastic while hot to a greater degree than when the comminuted final condensation product without such plasticity agent is used as a filler.

The second step in my process is accomplished in any of three ways, dependent upon the character of the mass desired. If it is desired to have the comminuted infusible or hardened product in excess of the fusible binder, the fusible binder, which is a fusible phenolic condensation product or resin of the character described in my applications above referred to, together with a hardening agent, may be dissolved in a suitable solvent and thoroughly mixed with the comminuted infusible product and dried, and the powder thus obtained pressed in the molds. Or a mixture of the fusible and infusible condensation products, together with a hardening agent, all in comminuted condition, may be pressed in the molds without previous use of solvent. Or thirdly, the fusible condensation product mixed with the hardening agent as a plastic mass may be mixed with the infusible condensation product in powdered condition and mixed thoroughly on heated rolls, such as are used in compounding rubber and allied plastic compositions. This latter method is preferred when the mass is desired to have good flowing qualities when compressed in the molds. The proportions in the first two cases when the fusible and infusible powders are mixed, or the powder and the solution of the fusible mass are mixed are—100 parts infusible comminuted condensation product and 15 to 100 parts fusible condensation product mixed with a hardening agent. The proportions in the third case cited may be—100 parts of the fusible product mixed with a hardening agent, and 10 to 100 parts of the infusible comminuted condensation product. The hardening agent referred to is preferably hexa-methylene-tetra-amin in proper proportion to combine with the fusible condensation product to form the infusible final product, as is described in my application Serial No. 543,236 and Patent No. 1,020,593 above referred to.

The third step of molding the mass may be accomplished by compressing the powdered mass or the plastic mass in a suitable matrix and heating to cause the same to become sufficiently plastic to properly fill the mold, and further heating to harden the whole to its full degree of hardness and render the same infusible throughout. The article may be removed from the mold after cooling, which causes a slight contraction. Or the mass may be compressed in the heated mold to properly consolidate and form the article, this operation, however, not being continued for a sufficient length of time to convert the fusible component of the mass into its infusible state, and subsequently heating the molded object after its removal from the matrix to harden it into its final infusible condition.

While the invention is specifically described in this application in connection with the manufacture of sound records, it is obvious that it may be used for molding various products.

Having now described my invention, what I claim and desire to protect by Letters Patent is as follows:—

1. The process of forming hard phenolic condensation products, which consists in mixing thoroughly together a filling body consisting of a hard, infusible final phenol-methylene condensation product in comminuted condition with a binder comprising a fusible phenol-methylene condensation product and a methylene-containing hardening agent for said fusible product, and heating the mass under conditions suitable to cause the final hardening reaction between said fusible product and hardening agent and the formation of a homogeneous mass in which said filling body is integrally bound, substantially as described.

2. The process of forming hard phenolic condensation products, which consists in mixing thoroughly together a filling body consisting of a hard, infusible final phenol-methylene condensation product in comminuted condition with a binder comprising fusible phenolic and methylene-containing ingredients adapted to form, upon sufficient heating, a final infusible condensation product of the same character as the said filling body, and heating the mass under conditions suitable to cause the final hardening reaction between the ingredients of the binder and the formation of a homogeneous uniform hard infusible product including said filling body, substantially as described.

3. The process of forming hard phenolic condensation products, consisting in incorporating a hard infusible phenolic condensation product in comminuted condition with a fusible phenolic condensation product and hexa-methylene-tetra-amin and a plasticity agent, heating the mixture and causing the final hardening reaction between the active components of the mass to take place, substantially as described.

4. The process of forming hard phenolic condensation products, consisting in comminuting to powder a hard infusible insoluble phenolic condensation product having a plasticity agent included therein, thoroughly mixing the same with a fusible phenolic condensation product and a small percentage of a methylene-containing substance, heating the mixture and causing the final hardening reaction between the fusible product and the said substance to take place, substantially as described.

5. The process of forming sound records, which consists in mixing together a fusible phenolic condensation product, a small percentage of a methylene-containing substance, and a hard infusible final phenolic condensation product in comminuted condition, and molding the mass with application of sufficient heat to cause the fusible product to become plastic and take the impression of the mold, heating further sufficiently to cause the final hardening reaction, cooling, and removing the record from the mold, substantially as described.

This specification signed and witnessed this 1st day of August 1910.

JONAS W. AYLSWORTH.

Witnesses:
 DYER SMITH,
 H. H. DYKE.